J. A. SWINEHART.
METHOD OF MAKING TIRES AND APPARATUS THEREFOR.
APPLICATION FILED MAY 16, 1913.
1,122,333.
Patented Dec. 29, 1914.
2 SHEETS—SHEET 2.
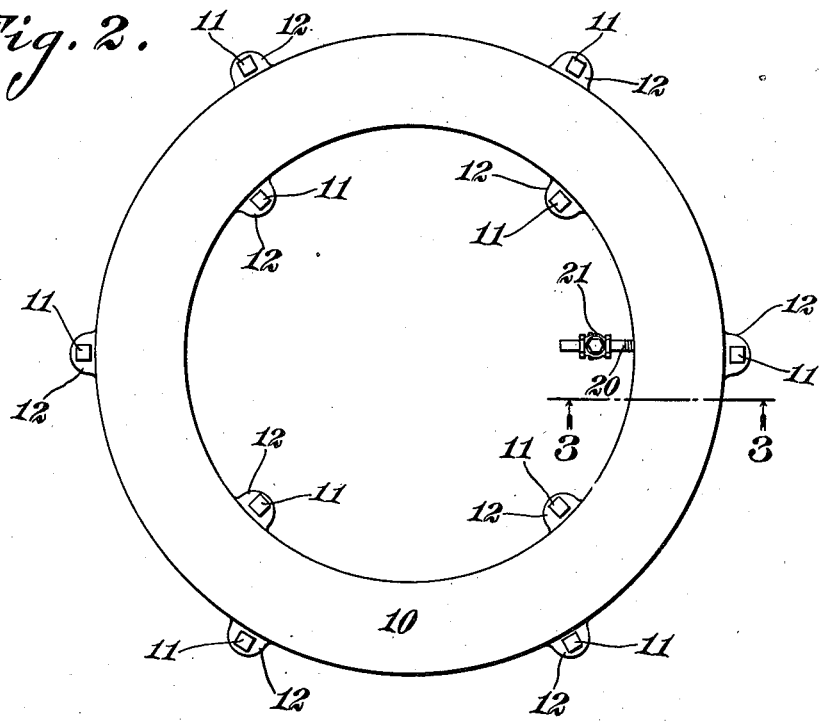
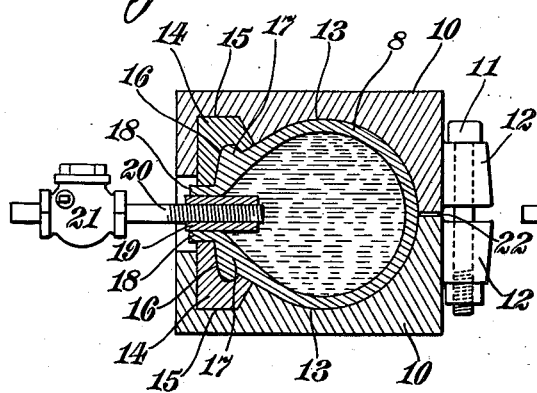
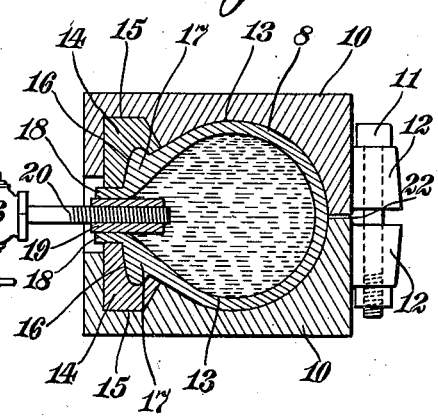

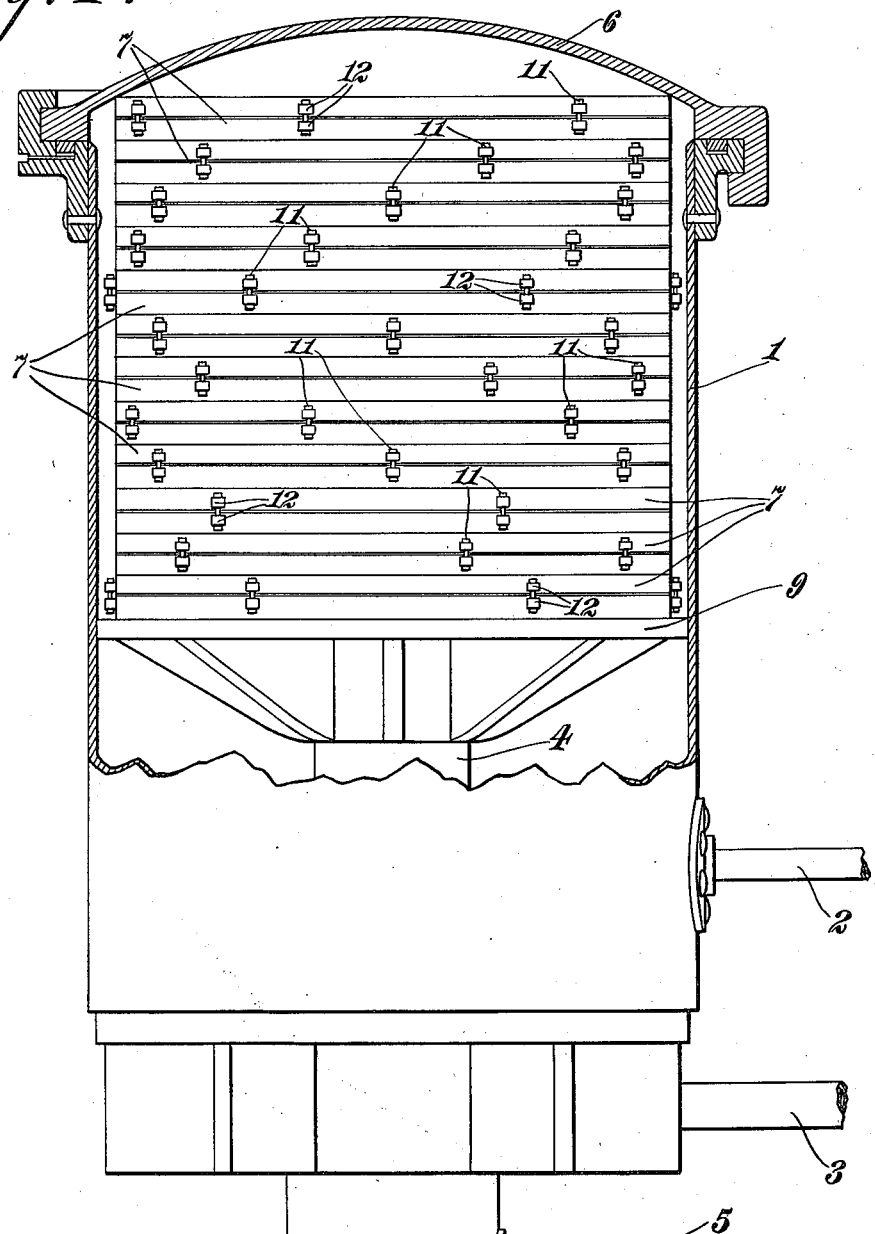

UNITED STATES PATENT OFFICE.

JAMES A. SWINEHART, OF ST. LOUIS, MISSOURI.

METHOD OF MAKING TIRES AND APPARATUS THEREFOR.

1,122,333.     Specification of Letters Patent.     Patented Dec. 29, 1914.

Application filed May 16, 1913. Serial No. 767,960.

*To all whom it may concern:*

Be it known that I, JAMES A. SWINEHART, a citizen of the United States, residing at the city of St. Louis and State of Missouri, have invented certain new and useful Improvements in Methods of Making Tires and Apparatus Therefor, of which the following is a specification.

In the present method of curing tires for automobiles and the like, in which the tires are built by hand on a form, then placed in a mold and hydraulic pressure applied from the inside of the tire to expand same within the mold while the tire is being cured, it sometimes happens that a tire becomes defective during the curing process, on account of the failure to permit the excess of pressure within the tire to escape before the tire is destroyed within the mold.

It is the object of the present invention to provide an improved process and apparatus for curing or vulcanizing tires which will allow any excess of pressure within the tire to escape automatically and thereby obviate the possibility of breaking the tire, thus insuring the production of a tire free of any defects.

In the accompanying drawings forming part of this specification, in which like numbers of reference denote like parts wherever they occur, Figure 1 is a side elevation, partly in section, of a hydraulic vulcanizing press of the jacketed type; Fig. 2 is a plan view of one of the tire molds; Fig. 3 is a sectional view, on an enlarged scale, on the line 3—3 Fig. 2; Fig. 4 is a similar view showing a modification.

In this improved process of curing or vulcanizing the tires, a hydraulic vulcanizing press 1 of the jacketed type is preferably employed, having the steam inlet pipe 2 and the outlet pipe 3. The hydraulic ram 4 within the press is operated by the pressure of fluid which is forced through pipe 5 into the lower part of the press by a pump (not shown). The press is provided with a removable cover 6 which is preferably constructed as shown and described in United States Letters Patent No. 955,739, granted to Alexander Adamson, April 19, 1910, so that same can be locked in a closed position during the vulcanizing process.

The molds 7 in which the tires 8 are placed to be cured or vulcanized are placed one on top of another upon the head 9 of the ram 4, as clearly shown in Fig. 1. Each mold comprises two separate annular members 10, which are connected by bolts 11, which pass through openings in lugs 12 on the outer and inner peripheral faces of said members as depicted in Figs. 2 and 3, these bolts being relatively shorter than the thickness of the mold. The opposed faces of the members 10 have annular grooves 13, respectively, formed therein, which grooves register with each other and form the walls of an annular opening, in which the tire 8 is placed to be expanded against the walls thereof. Each member 10 also has an annular member 14 fitted into an annular groove 15 in its inner face, which member 14 has an annular groove 16 in its inner face to receive one of the tire beads 17. The fabric of which the tire is formed is left long enough to project a little beyond the beads 17 as at 18, and between these edges 18 is placed a packing ring 19, which has a pipe 20 connected thereto, said pipe communicating with the interior of the tire and having a check-valve 21 of any suitable construction connected thereto to prevent the water or other fluid from escaping from the tire.

In practice, after a tire 8 has been placed in a mold 7, the former is filled with water which is forced through the pipe 20, the nuts on the bolts 10 having been tightened sufficiently only to prevent the water from escaping between the packing ring 19 and the projecting edges 18 of the tire 8, leaving a space 22 between the members 10. The molds 7 with the tires 8 filled with water therein are placed one on top of another upon the head 9 of the ram 4 and then the cover 6 of the press is closed and locked. Fluid from the pump is then admitted to the ram 4, so as to cause the latter to press the molds 7 against the cover 6 and, also, to press the members 10 of each mold closer together. Steam being admitted through the pipe 2 into the press circulates around the molds 7 and heats the water within the tires, with the result that the water within the tires expands and presses the tires against the inner walls of the molds. The pump is run at a speed to cause the head 9 of the ram 4 to exert a predetermined pressure against the molds, and whenever the water in a tire 8 expands sufficiently to exceed the pressure of the ram the members 10 of the mold 7 containing said tire will be forced apart, with the result of not only forcing the ram downward, but also permitting the excess of pressure within the tire to escape between the packing ring 19 and the edges 18 of the tire, after which the ram rises and again presses the member 10 closer together as before, thereby closing the escapement for the water within the tire and keeping same closed until the water within the tire again expands sufficiently to exceed the pressure of the ram.

It will be evident that by means of curing tires in the manner hereinabove described, the excess of pressure within the tires is allowed to escape automatically, whereby the tire is prevented from being broken or destroyed during the curing or vulcanizing of same.

In the form of the invention depicted in Fig. 4 the check-valve 21 is omitted entirely and a relief-valve 23 of any suitable construction, substituted therefor. In this form, it is unnecessary to use the hydraulic ram 4. The relief-valve 23 will open automatically and will allow the excess of pressure within the tire to escape therefrom.

I claim:

1. The herein-described method of curing tires in a hydraulic vulcanizing press consisting in inflating a tire between the separable parts of a mold with fluid, placing the mold with the inflated tire therein in the press, maintaining a uniform temperature within the press, and automatically maintaining a uniform pressure of the fluid within the tire by the pressure of the press ram.

2. In an apparatus for making tires, the combination with a mold composed of connected separable parts between which a tire is placed and inflated with fluid, means interposed between the edges of the tire to retain the fluid in the tire, and a jacketed vulcanizer in which the mold with the inflated tire therein is placed, of means adapted to press the parts of the mold together within the vulcanizer and to permit the escapement of some of the fluid from the tire, when the pressure of the fluid within the tire exceeds a predetermined pressure.

3. In an apparatus for making tires, the combination with a mold composed of connected separable parts between which a tire is placed and inflated with fluid, means interposed between the edges of the tire to retain the fluid in the tire, and a jacketed vulcanizer in which the mold with the inflated tire therein is placed, of hydraulic means adapted to press the parts of the mold together within the vulcanizer and to permit the escapement of some of the fluid from the tire, when the pressure of the fluid within the tire exceeds a predetermined pressure.

4. In an apparatus for making tires, the combination with a mold composed of connected separable parts between which a tire is placed and inflated with fluid, means interposed between the edges of the tire to retain the fluid in the tire, and a jacketed vulcanizer in which the mold with the inflated tire therein is placed, of means for instantly permitting some of the fluid to escape automatically from the tire, when there is an excess of pressure within the latter.

5. In an apparatus for making tires, the combination of a mold comprising a pair of separate members adapted to receive between them a fluid-inflated tire; means interposed between the edges of the tire for retaining the fluid therein; a jacketed vulcanizer wherein the mold with the inflated tire therein is placed; and means connecting the mold members together and with which said members are movably engaged, whereby said members are free to separate automatically when the pressure of the fluid within the tire exceeds a predetermined pressure, to permit some of the fluid to escape.

6. In an apparatus for making tires, the combination of a mold comprising a pair of separate companion members adapted to receive a tire between them and provided with oppositely-located apertured lugs; means for supplying inflating fluid to the interior of the tire, said means being provided with a check valve; a jacketed vulcanizer wherein the mold with the inflated tire therein is placed; and bolts loosely passed through the apertures in opposed lugs for connecting the mold members together, whereby said members are free to separate automatically when the pressure of the fluid within the tire exceeds a predetermined pressure, to permit some of the fluid to escape.

In testimony whereof I hereunto affix my signature in the presence of two witnesses.

JAMES A. SWINEHART.

Witnesses:
GLADYS WALTON,
GEORGE G. ANDERSON.